United States Patent [19]

Suzuki et al.

[11] 4,238,139

[45] Dec. 9, 1980

[54] PANEL ASSEMBLY

[75] Inventors: Kazuo Suzuki; Shoji Ariga; Yoshiaki Murakami, all of Toda, Japan

[73] Assignee: Clarion Co., Ltd., Tokyo, Japan

[21] Appl. No.: 9,267

[22] Filed: Feb. 2, 1979

[30] Foreign Application Priority Data

Feb. 16, 1978 [JP] Japan .............................. 53-18918[U]

[51] Int. Cl.³ ...................... A47B 81/06; A47B 95/02; H05K 5/00
[52] U.S. Cl. .................................... 312/7 R; 312/242; 312/244; 312/320; 16/110 R
[58] Field of Search ............... 312/242, 244, 204, 320, 312/7 R, 7 TV; 248/27.1; 16/110 R, 114 R, 124, DIG. 24, DIG. 40, DIG. 41

[56] References Cited

U.S. PATENT DOCUMENTS

| | | | |
|---|---|---|---|
| 1,726,794 | 9/1929 | Anetsberger et al. | 16/124 |
| 2,411,528 | 11/1946 | Dodington | 312/7 R |
| 2,599,434 | 6/1952 | Crane | 16/114 R |
| 3,302,221 | 2/1967 | Bysman | 16/110 R |
| 3,413,050 | 11/1968 | Sommers et al. | 312/244 |
| 3,922,047 | 11/1975 | Tsuji | 312/242 |
| 3,935,787 | 2/1976 | Fisher | 16/110 R |
| 4,087,141 | 5/1978 | Roberts | 312/320 |
| 4,156,794 | 5/1979 | Robinson | 16/110 R |

FOREIGN PATENT DOCUMENTS 2439902  8/1974 Fed. Rep. of Germany ...... 312/244 R

Primary Examiner—Victor N. Sakran
Attorney, Agent, or Firm—Wallenstein, Spangenberg, Hattis & Strampel

[57] ABSTRACT

A panel assembly having a handle member which is secured to a front face of an acoustic device, such as a mobile radio and a mobile stereo, together with a panel by screws.

3 Claims, 1 Drawing Figure

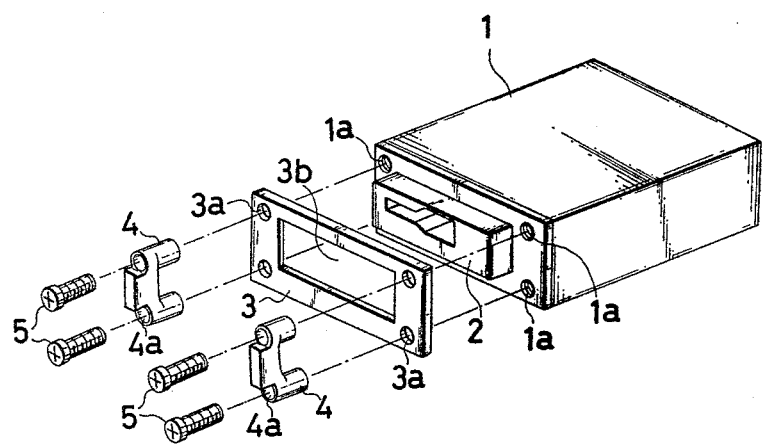

PANEL ASSEMBLY

BACKGROUND OF THE INVENTION

This invention relates to a panel assembly for an acoustic device such as a mobile radio or a mobile stereo which can afford a good appearance to such a device.

A conventional mobile radio or mobile stereo generally has an appearance simply formed of plain panels, which does not meet users' demands for a wide variety of designs.

SUMMARY OF THE INVENTION

It is an object of the present invention to provide a panel assembly which is capable of solving the problem involved in conventional mobile radios or stereos.

In accordance with the present invention, there is provided a panel assembly comprising: an acoustic device having threaded holes on its front face; a panel portion formed on said front face of the acoustic device; an ornamental panel formed with an opening having a size corresponding to that of the panel portion and holes corresponding to said threaded holes of the acoustic device; a handle member having holes corresponding to said threaded holes of the acoustic device and the holes of the ornamental panel; and screws adapted to be driven into the respective threaded holes of the acoustic device through the holes of the ornamental panel and the handle member to secure the handle member to said acoustic device together with said ornamental panel.

BRIEF DESCRIPTION OF THE DRAWING

The FIGURE shows an exploded perspective view of an acoustic device provided with a panel assembly in accordance with the present invention.

PREFERRED EMBODIMENT OF THE INVENTION

Referring now to the drawing, there is generally illustrated an acoustic device such as a mobile stereo or a mobile radio. A body 1 of the mobile stereo or the mobile radio has a panel portion 2 providing an access for station selection or tape loading at a front portion of said body, leaving some margins therearound. Threaded holes 1a are formed at the margins on either side of the panel portion 2. Numeral 3 designates an ornamental panel which has an opening 3b at its central portion for receiving said panel portion 2 therein and allowing the operation of the panel portion 2 in a position where the ornamental panel 3 is assembled with said panel portion 2. The ornamental panel 3 further has holes 3a at positions corresponding to those of the threaded holes 1a. A pair of U-shaped handle members 4 are provided each of which has a handle gripping portion extending parallel to and spaced from said ornamental panel and a pair of parallel spaced leg portions with screw-receiving holes 4a and 4a passing therethrough. These holes 4a and 4a are adapted to be aligned with the corresponding holes 1a and 3a, respectively. Screws 5 are meshable with the respective threaded holes 1a and adapted to be fitted in the holes 3a and 4a. The handle member 4 is so constructed that the screws 5 are not projected forwardly from the handle member when the screws 5 are assembled.

In accordance with one preferred fabrication method of the so constructed panel assembly, the panel portion 2 of the mobile stereo or mobile radio body 1 is first fitted into the opening 3b of the ornamental panel 3. The screws 5 are then inserted through the holes 4a of the handle body 4 and the holes 3a of the panel 3 and driven into the threaded holes 1a of the body 1 to simultaneously and conjointly secure the handle member 4 and the panel 3 to the body 1. Thus, the fabrication can be carried out very easily and a time required for the fabrication can be curtailed.

The panel assembly of the present invention is, thus, advantageous in fabrication operation and, in addition, can provide a wide variety of designs to mobile stereos or radios by varying the shape or pattern of the handle member. Furthermore, the handle member provided on the front face of the mobile stereo or radio body can advantageously and effectively prevent possible or inadvertent misoperation of the operating portion of the radio or stereo.

Further in accordance with the present invention, since the screws in assembled position is adapted to be indented or not to be projected from the handle member, safety can be assured.

We claim:

1. A panel assembly comprising: a radio device or the like having threaded holes on its front face: a panel portion formed on said front face of the device: an ornamental panel formed with an opening having a size corresponding to that of the panel portion and holes corresponding to said threaded holes of the device: at least one handle member, each handle member having holes corresponding to at least some of said threaded holes of the device and the holes of the ornamental panel, each of said handle members having a hand gripping portion extending generally parallel to said ornamental panel and spaced therefrom to provide a clearance space for the hand gripping the same; and screws adapted to be threaded into the respective threaded holes of the device through the holes of the ornamental panel and each handle member to secure each handle member to the panel portion of said device together with said ornamental panel.

2. A panel assembly as set forth in claim 1, wherein said handle member is adapted to receive said screws so that the screws may not project from the handle member.

3. The panel assembly of claim 1 wherein there are a pair of said handle members which are U-shaped members having a hand gripping bridging portion spaced from and parallel to said ornamental panel and parallel legs through which said handle member holes extend.

* * * * *